US012787135B2

United States Patent

Fu et al.

(10) Patent No.: US 12,787,135 B2
(45) Date of Patent: Nov. 3, 2026

(54) DRIVER ARRANGEMENT FOR POWERING A LOAD

(71) Applicant: SIGNIFY HOLDING B.V., Eindhoven (NL)

(72) Inventors: Jie Fu, Shanghai (CN); Zhiquan Chen, Shanghai (CN); Yu Wang, Shanghai (CN); Gang Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 170 days.

(21) Appl. No.: 18/860,044

(22) PCT Filed: Apr. 19, 2023

(86) PCT No.: PCT/EP2023/060151
§ 371 (c)(1),
(2) Date: Oct. 25, 2024

(87) PCT Pub. No.: WO2023/208689
PCT Pub. Date: Nov. 2, 2023

(65) Prior Publication Data

US 2026/0255454 A1 Aug. 27, 2026

(30) Foreign Application Priority Data

Apr. 27, 2022 (WO) ................ PCT/CN2022/089573
Jun. 3, 2022 (EP) .................................... 22177131

(51) Int. Cl.
*H05B 45/355* (2020.01)
*H02M 1/00* (2006.01)
(Continued)

(52) U.S. Cl.
CPC ........ *H05B 45/355* (2020.01); *H02M 1/0009* (2021.05); *H02M 1/0025* (2021.05);
(Continued)

(58) Field of Classification Search
CPC ................ H05B 45/355; H05B 45/345; H05B 45/3725; H02M 1/0009; H02M 1/0025;
(Continued)

(56) References Cited

U.S. PATENT DOCUMENTS 7,804,256 B2 * 9/2010 Melanson ............. H05B 45/38
363/21.01
12,581,575 B2 * 3/2026 Fu ....................... H02M 1/0006
2002/0190696 A1 12/2002 Darshan
2010/0202169 A1 8/2010 Gaboury et al.
(Continued)

FOREIGN PATENT DOCUMENTS

CN 105958825 B 4/2019
EP 4199332 A1 * 6/2023 .......... H02M 1/0038
(Continued)

*Primary Examiner* — Seokjin Kim

(57) ABSTRACT

A driver arrangement with overvoltage protection. A control circuit monitors a first output signal responsive to an offset signal which is configured to compensate for an AC mains power ripple in a power factor correction signal or the sum of this offset signal and the power factor correction signal. The power factor correction converter operates in a positive feedback mode using positive feedback responsive to the first output signal. The control circuit and the power factor correction converter (which produces the power factor correction signal) are further configured to override the positive feedback mode and enter a protection mode to restrict the power if a second output signal exceeds a predetermined threshold value, said second output signal being one of the power factor correction signal, the offset signal, and their sum.

14 Claims, 3 Drawing Sheets

(51) Int. Cl.
*H02M 1/14* (2006.01)
*H02M 1/42* (2007.01)
*H05B 45/345* (2020.01)
*H05B 45/3725* (2020.01)

(52) U.S. Cl.
CPC ......... *H02M 1/0077* (2021.05); *H02M 1/143* (2013.01); *H02M 1/4275* (2021.05); *H05B 45/345* (2020.01); *H05B 45/3725* (2020.01)

(58) Field of Classification Search
CPC ............... H02M 1/0077; H02M 1/143; H02M 1/4275
See application file for complete search history.

(56) References Cited

U.S. PATENT DOCUMENTS

| | | | | |
|---|---|---|---|---|
| 2012/0081017 | A1* | 4/2012 | Darshan | H05B 45/355<br>315/193 |
| 2017/0099710 | A1* | 4/2017 | Liu | H02M 1/42 |
| 2017/0288557 | A1 | 10/2017 | Fang et al. | |
| 2023/0098059 | A1* | 3/2023 | Adragna | H05B 45/375<br>315/186 |

FOREIGN PATENT DOCUMENTS

| | | | | |
|---|---|---|---|---|
| JP | 2014143854 | A | 8/2014 | |
| WO | 2013056356 | A1 | 4/2013 | |
| WO | 2016033681 | A1 | 3/2016 | |
| WO | WO-2023208689 | A1 * | 11/2023 | H02M 1/0025 |
| WO | WO-2024235775 | A1 * | 11/2024 | H02M 1/143 |

* cited by examiner

DRIVER ARRANGEMENT FOR POWERING A LOAD

CROSS-REFERENCE TO PRIOR APPLICATIONS

This application is the U.S. National Phase application under 35 U.S.C. § 371 of International Application No. PCT/EP2023/060151, filed on Apr. 19, 2023, which claims the benefit of European Patent Application No. 22177131.4, filed on Jun. 3, 2022 and International Application No. PCT/CN2022/089573, filed on Apr. 27, 2022. These applications are hereby incorporated by reference herein.

FIELD OF THE INVENTION

The present invention relates to the field of driver arrangements, particularly those that include power factor correction circuitry.

BACKGROUND OF THE INVENTION

Driver arrangements are commonly used to provide power to a load, such as a light emitting element. Typically, a driver arrangement will be capable of converting (e.g., AC) input power to (e.g., DC) output power suitable for powering the load. Some driver arrangements comprise power factor correction circuitry, for modifying or adjusting a power factor of a power factor correction (PFC) output signal that defines the output power provided to the load or on a bus.

The PFC output signal may be a signal across an output capacitor of the power factor correction circuitry, so that it is smoothed to emulate a DC signal. However, the power factor correction circuitry is a slow-response converting circuitry which regulates its output by sensing an average output. The PFC output signal will therefore retain a ripple (voltage, or current) of around 100/120 Hz, the precise frequency of which depends upon depending on the ripple of the AC input power, which is typically around 50/60 Hz. It would be advantageous to reduce or attenuate the size of the ripple in the PFC output signal, e.g. remove or compensate for the ripple, especially for LED lighting since the output luminous flux of an LED lighting arrangement is highly sensitive to the power provided to the LED lighting arrangement. The ripple of the PFC output signal, if not regulated, will result in a corresponding ripple in the brightness of light output by the LED, which would cause human perceptible or capturing device (such as camera) perceptible flicker.

A common way of overcoming this issue in the art is to use a second converting circuitry cascading from the power factor correction circuitry. This topology can be labelled a double-stage converting circuitry. The second converting circuitry regulates the PFC output signal into a further stabilized signal. One drawback of such double-stage converting circuitries is high material cost and high space requirements, since the second converting circuitry has to handle the whole PFC output signal meaning that its power rating is quite high requiring large and materially expensive components.

It has been proposed to use a switching converting circuitry at the output of the power factor correction circuitry, where the switching converting circuitry is used for compensating just the AC component of the PFC output signal, and not the whole PFC output signal. This means that the power rating of the switching converting circuitry is relatively smaller and has a lower cost and size compared to the double-stage converting circuitry. A suitable prior art example is described by US 2017/0288557 A1. This topology is often called/labelled a 1.5 stage or 1.25 stage converting circuitry, compared with the above mentioned double-stage. US20170099710A1 also discloses a similar topology.

US20100202169A1 discloses a overvoltage protection for a PFC converter.

There is an ongoing desire for improved driver arrangements.

SUMMARY OF THE INVENTION

Since the PFC circuitry is usually a high power converter and the switching converting circuitry is a low power converter, to increase efficiency and make the converters work in their respective sweet spots, a general principle in the above-mentioned technology is that the PFC circuitry still dominates in the total load powering signal and the switching converting circuitry is better to handle the ripple part only and using/providing as little power as possible. Thus, in the event that the output power/voltage is increased, it is better for the PFC circuitry to increase its output power/voltage more, in terms of absolute value, than switching converting circuitry. This can be deemed as a positive feedback in the output of the PFC circuitry according to a voltage of the total load powering signal.

For example, the above-mentioned technology can be used in a LED window driver that supports LEDs with a wide range of forward voltages. When a high forward voltage LED is connected to such a window driver, the window driver senses a high total output voltage and controls the PFC circuitry to increase its output voltage such that the PFC circuitry's output voltage is kept at, for example, 90% of the total output voltage.

The inventors have identified a defect or problem when implementing the above principle in real product. In particular, if the connected LED becomes open due to failure, the total output voltage increases and the driver will treat this increase as an incentive to further increase the output voltage of the PFC circuitry, and the PFC circuitry/whole driver will become over stressed and may fail.

The invention is defined by the claims.

Approaches proposed by this disclosure provide a improved circuit topology that provides overvoltage protection for a driver arrangement that makes use of switching converting circuitry, i.e., a switched-mode power supply, for compensating the AC component of a PFC output signal.

Embodiments make use of a control circuit that restricts the maximum power of the PFC output signal when a certain output signal reaches a predetermined threshold value. This provides an effective mechanism for providing overvoltage protection in a driver arrangement.

According to examples in accordance with an aspect of the invention, there is provided a driver arrangement comprising a power factor correction, PFC, converter comprising an input interface and a first output interface, the power factor correction converter being adapted to: receive an AC mains power at the input interface; convert the AC mains power into a PFC output signal, the PFC output signal having a ripple corresponding to the AC mains power; and provide the PFC output signal at the first output interface.

The driver arrangement also comprises a switched-mode power supply comprising a second output interface connected in series with the first output interface, wherein the switched-mode power supply is configured to generate an offset signal in series with the PFC output signal so as to superimpose the offset signal with the PFC output signal, to compensate for the ripple corresponding to the AC mains power, thereby producing a load powering signal.

The driver arrangement also comprises a control circuit configured to: sense a first output signal responsive to the voltage of one of the offset signal and the load powering signal, wherein the control circuit is configured, as a positive feedback mode, to control the power factor correction converter to increase the PFC output signal responsive to the voltage of one of the offset signal and the load powering signal increasing as indicated by the first output signal.

Most significantly, the control circuit is also configured to sense a second output signal responsive to the voltage of one of the PFC output signal, the offset signal and the load powering signal, wherein the control circuit is configured to control the power factor correction converter to override the operation mode and enter a protection mode to restrict the power of the PFC output signal, optionally the maximum power (e.g., the maximum voltage), responsive to the second output signal being at and/or going above a predetermined threshold value.

Embodiments thereby use a first output signal to control the operation of the PFC converter with the above mentioned positive feedback loop, whilst monitoring a second output signal to determine whether to override said positive feedback loop and/or restrict the maximum power output by the PFC converter. This approach provides a mechanism for performing overvoltage identification and protection using the signals produced by the driver arrangement of positive feedback controlled-PFC converter plus the switched-mode power supply. Proposed approaches provide low-cost and easily implementable mechanisms for providing overvoltage protection.

In an embodiment, the first output interface and the second output interface may be connected in series. This provides an effective mechanism for allowing the offset signal to superimpose the PFC output signal to compensate the ripple of the PFC output signal and produce the load powering signal.

In an embodiment, the control circuit is configured to restrict the power of the PFC output signal by either: restricting the maximum power of the PFC output signal; or controlling the PFC converter to operate in a protection mode in which the PFC converter is stopped from outputting the PFC output signal, responsive to the second output signal being at or above the predetermined threshold value. In this embodiment, the control circuit can either enable limited operation of the PFC converter or stop the PFC converter completely to avoid over stress the driver arrangement.

In some examples, the predetermined threshold value is a value that is caused by an open fault of a load powered by the load powering signal. This approach means that the overvoltage protection will begin or initiate when there is an open fault in the load. This increases a safety of the driving arrangement.

The control circuit may be configured to, responsive to the second output signal going below a critical value, control the PFC converter to operate in a positive feedback mode, in which the PFC converter increases the PFC output signal as the first output signal increases such that the percentage of the PFC output signal in the load powering signal is no less than a predetermined percentage by

- calculating a percentage of the PFC output signal in the load powering signal;
- increasing the PFC output signal if the percentage is less than the predetermined percentage, and decreasing the PFC output signal if the percentage is higher than the predetermined percentage.

This approach thereby controls the driver arrangement to perform the positive feedback power factor correction when the first output signal is indicative of there being no overvoltage, allowing for the conventional or normal operation of the driver arrangement during non-overvoltage periods of time.

The switched-mode power supply may comprise a current control loop adapted to sense an electrical current of the load powering signal, compare the electrical current with the electrical current reference; and control the switched-mode power supply to regulate the offset signal in a way of increasing the offset signal if the electrical current is less than the electrical current reference, and decreasing the offset signal if the electrical current is larger than the electrical current reference such that the sensed current follows an electrical current reference which is constant.

This embodiment provides a technique for accurate generation of an offset signal that compensates for any AC mains power ripple in the PFC output signal, e.g., by ensuring that the current through the load is near-constant.

In examples, the control circuit comprises a first voltage sense circuit to sense, as the first output signal, any one of: a voltage of the load powering signal; a voltage of the PFC output signal; or a voltage of the offset signal.

When a normal load is connected, any of all the three voltages can indicate the load voltage thus it can be used as an incentive for the positive control of the PFC output voltage. Among them, the voltage of the load powering signal is the most directly indicative, thus it is preferred to use the voltage of the load powering signal as the first output signal.

In examples, the control circuit comprises a second voltage sense circuit to sense, as the second output signal, any one of: a voltage of the load powering signal; a voltage of the PFC output signal; or a voltage of the offset signal.

When the load is open, any of all the three voltages will increase thus it can be used as a trigger for overriding the positive control and restricting the PFC output voltage. Among them, the voltage of the offset signal is the most quickly responsive to the open load (since the switched-mode power supply has a fast response to increase the offset signal for maintaining the interrupted output current due to open load) thus it is preferred to use the voltage of the offset signal as the second output signal.

In some embodiments, the PFC converter comprises a feedback terminal and the PFC converter is configured to modify the PFC output signal responsive to the signal at the feedback terminal, and the control circuit is configured to modify the signal at the feedback terminal.

The feedback terminal of a PFC converter/IC is normally used for setting its output voltage, thus it is convenient to control the feedback terminal of the PFC converter to implement the voltage control proposed by the present invention.

The control circuit may comprise: a first signal conversion circuit between the first voltage sense circuit and the feedback terminal, adapted to convert, for the feedback terminal, the first output signal with one of a positive gain and an inverted gain; and a second signal conversion circuit between the second voltage sense circuit and the feedback terminal, adapted to convert the second output signal, for the feedback terminal, with the other one of the positive gain and the inverted gain.

This approach provides a technique that allows controlling the PFC output signal using a voltage at a single terminal. Thus, both the overvoltage protection and positive feedback control are achieved using a single terminal for the PFC converter.

Put another way, the same terminal that is used to provide feedback for controlling the PFC output signal (by the PFC converter) is controlled when an overvoltage occurs to directly restrict the PFC output signal.

By controlling the feedback terminal in this way, the operating principle of the PFC converter can be exploited to reduce or restrict the voltage of the PFC output signal when overvoltage occurs. An overvoltage event sensed by the second voltage sense circuit will cause the voltage at the feedback terminal to move in an opposite direction to those caused by an increase in the load powering signal. In this way, an overvoltage event will cause the PFC output signal to reduce, thereby restricting the power of the PFC output signal.

In some examples, the first voltage sense circuit comprises a voltage divider connected across the connection of the first output interface and the second output interface, wherein the voltage divider is configured to sense the voltage of the load powering signal as the first output signal. This approach provides a simple and reliable mechanism for sensing the voltage of the load powering signal, and recognizes that the voltage of a load powering signal is a useful parameter for providing feedback to the PFC converter.

In some examples, the first signal conversion circuit comprises a voltage inverting circuit connected between the voltage divider and the feedback terminal and configured to generate, at the feedback terminal, a voltage that is inversely changed with respect to the voltage of the load powering signal. The PFC converter may be adapted to increase the PFC output signal as the voltage at the feedback terminal decreases and therefore as the first output signal increases. This approach provides a reliable mechanism for providing feedback to the PFC converter and for the PFC converter to react/respond to the feedback.

In some examples, the second signal conversion circuit comprises a trigger circuit coupled to the second output interface and adapted to sense the voltage of the offset signal as the second output signal. The trigger circuit is configured to pull the feedback terminal to a high voltage when the second output signal is at or above the predetermined threshold value.

The PFC converter may be adapted to control the PFC converter to restrict the PFC output signal when the voltage at the feedback terminal is the high voltage. In this case the first signal conversion circuit has an inverted gain and the second signal conversion circuit has a positive gain.

In some examples, the switched-mode power supply is adapted to, responsive to a voltage of the offset signal reaching the predetermined voltage threshold, enter a protection mode and clamp the voltage of the offset signal at the predetermined voltage threshold. This approach also disables the switched-mode power supply when overvoltage occurs and improves the overvoltage protection performance of the driver arrangement.

There is also proposed an electronic arrangement comprising any herein disclosed driver arrangement; and a load connected to the first output interface and second output interface and configured to be powered by the load powering signal. In some preferred examples, the load comprises one or more light emitting diodes.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
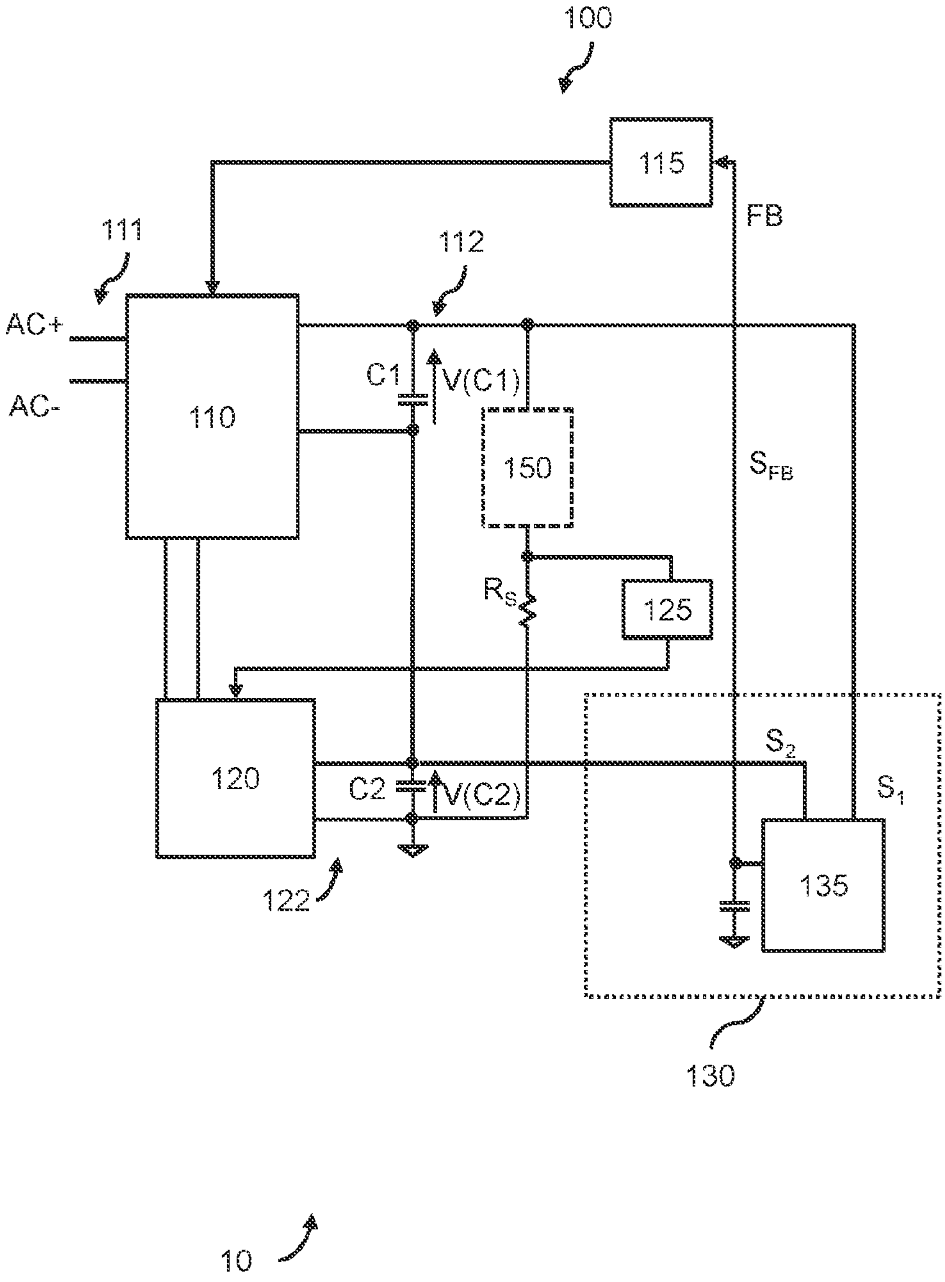
FIG. 1 conceptually illustrates a driver arrangement.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a driver arrangement with overvoltage protection. A control circuit monitors a first output signal and a second output signal, each responsive to a power factor correction signal and/or an offset signal which is configured to compensate for an AC mains power ripple in the power factor correction signal and/or the total signal. The control circuit and the power factor correction converter (which produces the power factor correction signal) are configured to restrict the maximum power if the second output signal exceeds a predetermined threshold value. Otherwise, the power factor correction converter operates using positive feedback responsive to the first output signal.

FIG. 1 illustrates a driver arrangement 100 according to an embodiment. The driver arrangement 100 is configured for powering or driving a load 150 which is separate from the driver arrangement 100.

The driver arrangement 100 may form part of an electronic arrangement 10 comprising the driver arrangement 100 and the load 150. The load 150 may, for instance, comprise one or more light emitting diodes or a light emitting diode arrangement. Other suitable loads will be apparent to the skilled person.

The driver arrangement 100 comprises a power factor correction converter 110 or PFC converter. The driver arrangement 100 also comprises a switched-mode power supply 120 (or SMPS) and a control circuit 130.

The PFC converter 110 comprises an input interface 111 and a first output interface 112.

The input interface 111 is configured to receive an AC mains power AC+, AC−. This may be provided by an AC mains power supply/grid (not shown).

The PFC converter 110 is configured to convert the AC mains power AC+, AC− into a PFC output signal V(C1), that is provided at the first output interface 112. The PFC output signal V(C1) has a ripple that corresponds to the AC mains power. Thus, the ripple may follow the inherently 50/60 Hz sinuous waveform of the AC mains.

Generally, power factor correction converters are configured to correct or account for a distortion in power provided to a load or drawn by a load. In general, the output of the power factor correction circuitry follows the inherently 50/60 Hz sinuous waveform of the AC mains, resulting in an AC mains power ripple in the PFC output signal V(C1).

Suitable PFC converters for use in embodiments are well known in the art. As an example, the PFC converter may be or comprise a boost converter, a buck converter and/or a buck-boost converter. Those skilled in the art would understand that any other type of converter is also applicable as long as it can provide PFC functionality.

To at least partially reduce a high frequency switching signal in the PFC output signal V(C1), the power factor conversion circuitry may comprise a first output capacitor C1 connected across the first output interface 112, such that the PFC output signal V(C1) is a near-continuous signal that can be drawn by a load connected to the first output interface 112. However, the PFC output signal V(C1) will still have a low frequency ripple, representing the residual periodic variation resulting from the AC mains power (which has not been suppressed). Indeed, a PFC converter is designed to keep the low frequency ripple, as otherwise the output would not follow the input.

The switched-mode power supply 120 is configured to compensate for the ripple in the PFC output signal V(C1). More specifically, the switched-mode power supply is configured to generate an offset signal V(C2) which is superimposed with the PFC output signal V(C1) to produce a load powering signal, which is here equal to V(C1)+V(C2). The load powering signal is provided to or drawn by the load 150. The offset signal V(C2) thereby compensates the ripple (of the AC mains power) in the PFC output signal V(C1) to thereby smooth the power provided to the load 150.

The offset signal V(C2) is provided to a second output interface 122. In the illustrated example, the second output interface is connected in series with the first output interface 112. The load 150 is connectable between or across the first 112 and second 122 output interfaces. Thus, the load powering signal may be the signal across the first and second output interfaces.

A second output capacitor C2 may be connected between the terminals of the second output interface.

The operation of the PFC converter 110 may controlled by a PFC controller 115. Although illustrated as a separate component for illustrative clarity, the PFC controller may form an integral part of the PFC converter 110. Alternatively, the PFC controller 115 may be considered to form part of the control circuit (later described).

The PFC controller is configured to control the PFC converter 110 responsive to the load powering signal (e.g., V(C1)+V(C2)). The control of the PFC controller may be a positive feedback loop. Thus, as the load powering signal increases, so does the PFC output signal. In this way, the PFC output signal can automatically follow the load powering signal's changes to keep output of the PFC converter as high as possible and the output of the switched-mode power supply as a value as small as possible (whilst still compensating for the ripple), thereby ensuring that the overall efficiency of the driver arrangement is high.

Instead of responding to the load powering signal, the PFC controller 115 may instead respond to the PFC output signal and/or the offset signal. Suitable control approaches will be apparent to the skilled person.

Thus, more generally, the PFC controller 115 may respond to a first output signal $S_1$ that is responsive to the PFC output signal and/or the offset signal and/or the total load powering signal. It will be clear that a signal that is responsive to the load powering signal is responsive to a combination of the PFC output signal and the offset signal.

The operation of the switched-mode power supply 120 may be controlled by a SMPS controller 125. Although illustrated as a separate component for illustrative clarity, the SMPS controller 125 may form an integral part of the switched-mode power supply 120. Alternatively, the SMPS controller 125 may be considered to form part of the control circuit (later described).

The SMPS controller 125 may be configured to control the switched-mode power supply 120 responsive to a voltage across a sense resistor $R_S$ (which is connected in series with the load 150). Thus, the switched-mode power supply is controlled responsive to the electrical current through the load 150.

In this way, the driver arrangement may comprise a current control loop adapted to sense an electrical current of the load powering signal and control the switched-mode power supply to regulate the offset signal such that the sensed current follows an electrical current reference which is optionally substantially constant. The current control loop is formed of the sense resistor $R_S$ and the SMPS controller 125.

In particular, the SMPS controller 125 may be configured to control the offset signal such that the electrical current through the load (as measured by a voltage across the sense resistor $R_S$) is aligned with an electrical current reference. The electrical current reference is preferably constant or near-constant, i.e., substantially constant. This process is called constant current regulation. This means that the offset signal V(C2) will track the AC mains power ripple in the PFC output signal V(C1), thereby compensating for this ripple in the PFC output signal.

The control of the switched-mode power supply 120 may be a high-speed control loop, to ensure that the offset signal V(C2) varies along with the ripple in the PFC output signal V(C1).

In one example, in case that the load (e.g., a first LED) with a smaller forward voltage is replaced by a load with a larger forward voltage (e.g., a second LED with a larger forward voltage), first the load current will be less than the electrical current reference and in turn the switched-mode power supply 120 will increase its output voltage; the PFC converter will also sense the increased voltage of the total load powering signal and increases the PFC output voltage; the PFC output voltage results in more load current; and the switched-mode power supply 120 gradually decreases its output voltage. The system will converge at a state wherein the PFC converter outputs a large portion of the forward voltage and the switched-mode power supply outputs a small portion, wherein the load current is same with the electrical current reference.

Examples of suitable switched-mode power supplies include buck converters or buck-boost converters. Other examples will be apparent to the skilled person.

Approaches for controlling a switched-mode power supply to compensate for the AC mains power ripple in the PFC output signal are established in the art, e.g., as demonstrated by US 2017/0288557 A1.

In some examples, the switched-mode power supply 120 (e.g., the SMPS controller 125) is adapted to, responsive to a voltage of the offset signal reaching a predetermined voltage threshold, enter a protection mode and clamp the voltage of the offset signal at the predetermined voltage threshold. This approach improves the overvoltage protection performance of the driver arrangement.

The present disclosure relates to an approach for providing overvoltage protection for the driving arrangement previously described.

In particular, it has been recognized that if the load 150 exhibits an open fault (or no load is connected), then the current through the sensing resistor $R_S$, i.e., the load current, is zero. Due to the closed loop control of the switched-mode power supply, a large difference will be seen between the electrical current reference and the sensed electrical current (i.e., the current through the sensing resistor $R_S$). This would result in the voltage of the offset signal V(C2) produced by the switched-mode power supply 120 being extremely high, leading to a load powering signal with a very high voltage, which is in itself dangerous (e.g., to an individual wishing to replace or fix the load that would draw the load powering signal).

Moreover, the voltage of the PFC output signal V(C1) will also be adjusted higher, as it is responsive to the voltage of the load power signal in a positive feedback manner. This high voltage would or may damage the first output capacitor C1 (if present) and overstress the PFC converter. Thus, overvoltage protection is desired.

There is also a problem if the voltage of the PFC output signal is too high, e.g., if there is a short circuit to a very high voltage or a breakdown in the operation of the power factor correction converter.

The present disclosure proposes an effective control circuit, that is able to make the PFC output signal automatically adjustable according to LED load voltage, whilst at the same time realizing overvoltage protection functionality.

In particular, the present disclosure proposes the concept of configuring the PFC converter and/or control circuit to operate in two modes: a "normal mode", which can also be labelled an operation mode or normal operation mode, and a "protection mode". When controlled in the normal or operation mode, the PFC output signal is controlled using positive feedback, such that the PFC converter increases the PFC output signal responsive to the PFC output signal and/or the offset signal increasing. When triggered by a certain condition and operating in the protection mode, the PFC converter restricts the maximum power of the PFC output signal, e.g. clamps the maximum power of the PFC output signal.

The switch between the normal/operation mode and the protection mode is responsive to a second output signal $S_2$. The second output signal is responsive to the PFC output signal and/or the offset signal and/or their sum, which is (e.g., the voltage of) the total load powering signal. Tn particular, the protection mode is activated responsive to the second output signal being at and/or going above a predetermined threshold value. Otherwise, the system operates in the normal/operation mode.

It is also recognized that the overvoltage protection functionality could be merged into a smart PFC output signal regulation circuit. More specifically, the load powering signal and the overvoltage signal could be fed to the PFC controller 115 via a same feedback terminal FB.

Approaches also recognize that the overvoltage protection functionality can be realized by leveraging or monitoring the offset signal on the switched-mode power supply's output.

The control circuit of the driving arrangement provides the overvoltage protection functionality. In particular, the control circuit 130 is configured to implement this overvoltage protection functionality via the feedback $S_{FB}$ provided to the PFC controller 115 and/or PFC converter 110 at a feedback terminal FB. The PFC converter is configured to modify the PFC output signal V(C1) responsive to the voltage at the feedback terminal FB.

More specifically, when operating in a normal mode, the control circuit 130 is configured to sense a first output signal $S_1$ responsive to the PFC output signal and/or the offset signal (e.g., as illustrated—the load powering signal) and/or their sum which is the voltage of the total load powering signal. The control circuit is configured to control the PFC converter to increase the PFC output signal responsive to the PFC output signal and/or the offset signal increasing as indicated by the first output signal.

In protection mode, the control circuit 130 is also configured to sense a second output signal $S_2$ responsive to the PFC output signal and/or the offset signal and/or their sum. The control circuit and power factor correction converter are configured to restrict the maximum power of the PFC output signal responsive to the second output signal being at and/or going above a predetermined threshold value.

Figure 2:
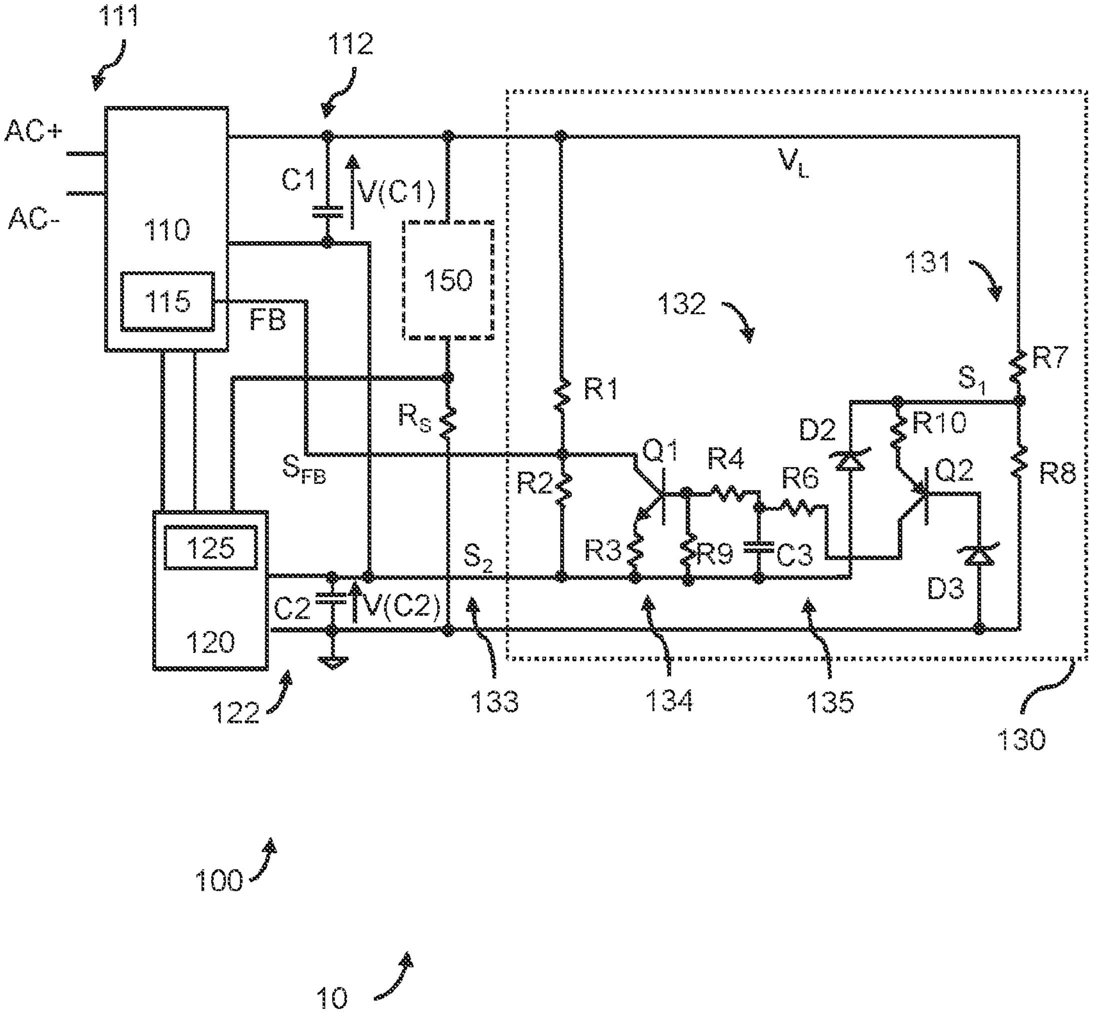
FIG. 2 illustrates a driver arrangement including circuitry for a control circuit.

FIG. 2 illustrates the driver arrangement 100 with a working example of electronic circuitry for the control circuit 130, it is noted that if two crossing wires do not have a dot at the crossing, the two wires are not electrically connected.

For the sake of illustrative ease, the PFC controller 115 has been illustrated as being integrated with the PFC converter 110. Similarly, the SMPS controller 125 has been illustrated as being integrated with the switched-mode power-supply 120.

The PFC converter 110, especially the PFC controller 115, comprises a feedback terminal FB. The PFC converter/PFC controller is configured to modify the PFC output signal V(C1) responsive to the voltage at the feedback terminal FB. The control circuit 130 of the invention controls the PFC output voltage in normal mode and protection mode via this feedback terminal FB.

The control circuit 130 comprises a first voltage sense circuit 131. The first voltage sense circuit is here configured to sense, as the first voltage output signal $S_1$, the voltage of the load powering signal $V_L$.

In the illustrated example, the first voltage sense circuit 131 comprises a voltage divider R7, R8 connected across the connection of the first output interface and the second output interface. The voltage divider is thereby configured to sense the voltage of the load powering signal as the first output signal $S_1$, wherein the load powering signal is the sum/superimposing of the PFC output and the switched-mode power supply output.

For the normal mode, the control circuit also comprises a first signal conversion circuit 132 between the first voltage sense circuit 131 and the feedback terminal FB. The first signal conversion circuit 132 is adapted or configured to convert, for the feedback terminal, the first output signal with one of a positive gain and an inverted gain.

In this example, the first signal conversion circuit comprises a voltage inverting circuit R4, Q1 such that the first signal conversion circuit has an inverted gain. A first transistor Q1 couples the feedback terminal FB to the second output interface 122 or the second output capacitor C2. In particular, the first transistor Q1 is an NPN transistor, having its collector connected to the feedback terminal FB and its emitter connected to the second output interface 122 or the second output capacitor. The base of the first transistor Q1 is connected to the first voltage sense circuit 131 via a control resistor R4. A current flowing through the control resistor R4 (or further resistor R9) thereby defines a base current of the first transistor Q1. The control resistor R4 is connected to the voltage divider of the first voltage sense circuit 131 such that as the voltage of the first output signal increases, so that current flowing through the control resistor R4 increases. This increases the base current of Q1, and thereby the collection current of Q1, causing the voltage at the feedback terminal to drop or reduce.

Thus, the voltage inverting circuit is configured to generate, at the feedback terminal, a voltage that is inversely changed with respect to the voltage of the load powering signal.

The PFC controller 115 may be adapted to control the PFC converter to increase the PFC output signal the voltage at the feedback terminal FB decreases (and therefore, as the first output signal increases). This can be achieved by controlling the first output signal V(C1) inversely to the voltage at the feedback terminal FB. Approaches for performing such a control mechanism are well-established in the art.

In particular, the voltage at the feedback terminal VB can be compared with a given reference voltage for the PFC output signal. Accordingly, the voltage of the PFC output signal will increase as the voltage at the feedback terminal decreases. Similarly, when the voltage of the load powering signal decreases, so the voltage at the feedback terminal increases and the voltage of the PFC output signal voltage is decreased. Accordingly, the PFC output signal can be automatically adjustable according to the load powering signal. In an alternative embodiment, the current injected to the feedback terminal FB is sensed by the PFC controller and the PFC output voltage is controlled inversely to this injected current. This is analogous to the above-described voltage version.

For the protection mode, the control circuit 130 also comprises a second voltage sense circuit 133. The second voltage sense circuit 133 is configured to sense the voltage of the offset signal as the second output signal $S_2$. In the illustrated example, the second voltage sense circuit comprises a direct connection to the second output interface 122 or the second output capacitor C2, such that the voltage of the offset signal directly represents the second output signal $S_2$.

The control circuit 130 also comprises a second signal conversion circuit 134 connected between the second voltage sense circuit 133 and the feedback terminal FB. The second signal conversion circuit 134 is configured to convert the second output signal $S_2$, for the feedback terminal FB, with the other one of the positive gain and the inverted gain (i.e., the opposite polarity to the first signal conversion circuit).

The second signal conversion circuit 134 may, for instance, comprise comprises a trigger circuit R3, Q1. The trigger circuit is coupled to the second output interface 122 and is adapted to sense the voltage of the offset signal as the second output signal. The trigger circuit then pulls the feedback terminal to a high voltage when the second output signal is at or above the predetermined threshold value.

The trigger circuit repurposes the first transistor Q1 and further comprises a second control resistor R3 that connects the emitter of the first transistor to the second output interface 122 or the second output capacitor C2.

As previously described, if there is an open fault in the load 150 or the load is disconnected, then the current through the sense resistor $R_S$ is zero. As the switched-mode power supply controls the offset signal using a constant current regulation technique, this will cause the voltage of the offset signal V(C2) to increase, e.g., until the output voltage is equal to the input voltage of the switched-mode power supply.

The second control resistor R3 is configured such that (only) when the voltage of the offset signal V(C2) reaches a predetermined threshold value, the voltage potential at the emitter of the first transistor Q1 reaches the voltage potential at the base of the first transistor. This will switch the first transistor Q1 off.

The feedback terminal FB is then pulled to a high voltage by a resistor arrangement R1, R2. The high voltage may be the voltage of the load powering signal, or a voltage divided version of the same. This high voltage may be much higher than the voltage present during normal mode of operation of the feedback terminal (e.g., the voltage provided by the first control signal $S_1$).

As the PFC converter is configured such that the voltage of the PFC output signal decreases with an increasing voltage at the feedback terminal, pulling the voltage at the feedback terminal FB to the high voltage will automatically decrease the PFC output signal, effectively clamping the PFC output signal to a maximum value. In this way, the control circuit is able to restrict the maximum power of the PFC output signal responsive to the second output signal $S_1$ being at and/or going above a predetermined threshold value Thus, overvoltage protection is provided using the control circuit, whilst exploiting the natural or normal operation of the PFC converter and/or switched-mode power supply.

Figure 3:
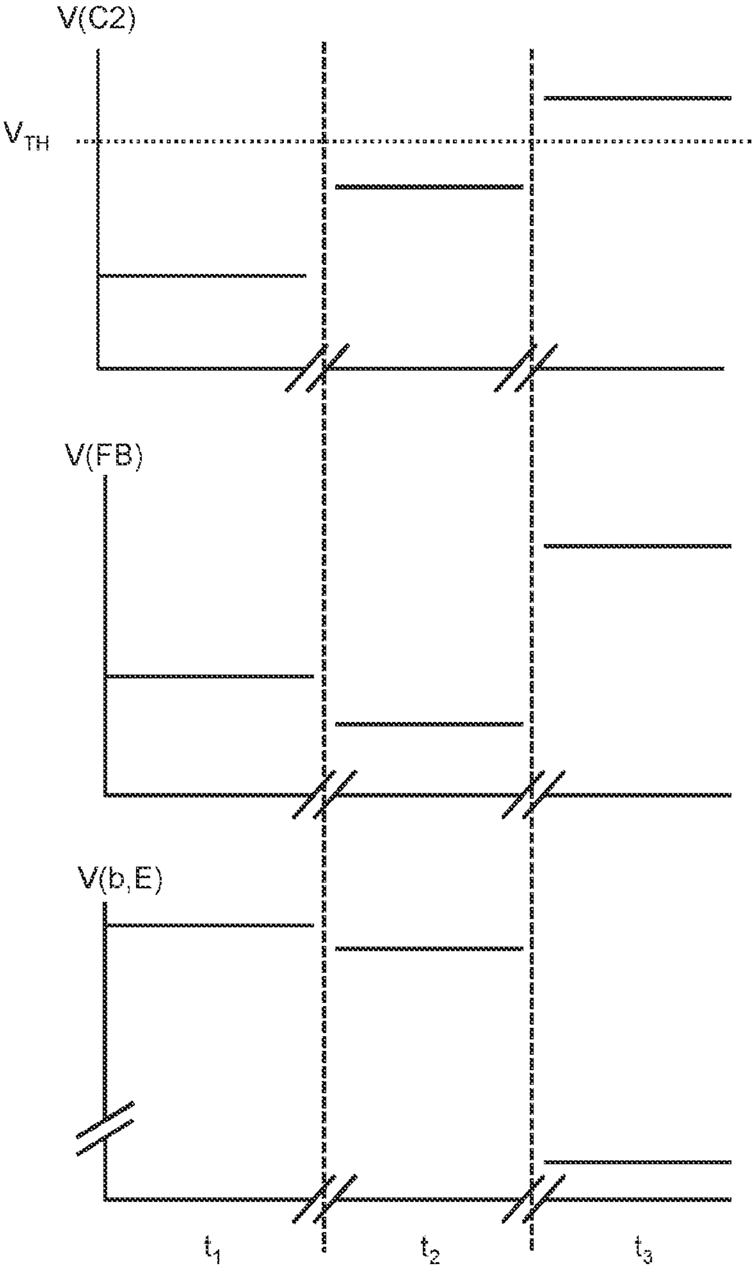
FIG. 3 illustrates waveforms of signals in a driver arrangement.

For improved contextual understanding, FIG. 3 illustrates various voltages in the driving arrangement 100 for three different scenarios $t_1$, $t_2$, $t_3$.

Three waveforms are provided in each scenario. A first waveform V(C2) illustrates a voltage of the offset signal. A second waveform V(FB) illustrates a voltage at the feedback terminal. A third waveform V(b,E) demonstrates a voltage between the base (b) and emitter (E) of the first transistor Q1, or base-emitter voltage.

A first scenario $t_1$ demonstrates a situation in which the offset signal is below a predetermined threshold value $V_{TH}$. It could be that the load is an LED load with a small forward voltage.

A second scenario $t_2$ demonstrates a situation in which the offset signal is larger, but is still below the predetermined threshold value $V_{TH}$. Both the base-emitter voltage V(b,E) and the feedback voltage $V_{FB}$ reduce. It could be that the load is changed into an LED load with a larger forward voltage.

A third scenario $t_3$ demonstrates a situation in which the load is open, and the offset signal V(C2) is even larger, and exceeds the predetermined threshold value $V_{TH}$. In this scenario, the base voltage of the first transistor is less than the emitter voltage, e.g., the base-emitter voltage is negative, causing the first transistor Q1 to turn off. This will cause the feedback voltage $V_{FB}$ to suddenly increase. This would result in the PFC output signal having a reduced voltage, thereby providing overvoltage protection.

Turning back to FIG. 2, further optional features of the control circuit 130 are illustrated.

As one example, the control circuit may further comprise an RC filter 135 coupled between the first voltage sense circuit 131 and the first signal conversion circuit 132. This may help filter any high-frequency signals present in the first output signal $S_1$.

Other circuitry components R10, D2, Q1, D3 of the control circuit 130 act as a buffer and/or amplifier for the first output signal produced by the voltage divider 131.

There is also proposed an electronic arrangement 10 comprising any herein described driver arrangement 100 and a load 150 configured to be powered by the load powering signal produced by such a driver arrangement. Thus, the load is connected to the first output interface 112 and the second output interface 122 of the driver arrangement.

The load may, for instance, comprise one or more light emitting diodes or a light emitting diode arrangement. Other suitable loads will be apparent to the skilled person.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A driver arrangement comprising:

a power factor correction, PFC, converter comprising an input interface and a first output interface, the power factor correction converter being adapted to:
  - receive an AC mains power at the input interface;
  - convert the AC mains power into a PFC output signal, the PFC output signal having a ripple corresponding to the AC mains power; and
  - provide the PFC output signal at the first output interface;

a switched-mode power supply comprising a second output interface connected in series with the first output interface, wherein the switched-mode power supply is configured to generate an offset signal in series with the PFC output signal so as to superimpose the offset signal with the PFC output signal, to compensate for the ripple corresponding to the AC mains power, thereby producing a load powering signal;

a control circuit configured to:
  - sense a first output signal responsive to the voltage of one of the offset signal and the load powering signal, wherein the control circuit is configured to, as a positive feedback loop, control the power factor correction converter to increase the PFC output signal responsive to the voltage of one of the offset signal and voltage of the load powering signal increasing as indicated by the first output signal; and
  - sense a second output signa responsive to the voltage of one of the PFC output signal, the offset signal and the load powering signal, wherein the control circuit is configured to override the positive feedback loop and enter a protection mode to control the power factor correction converter to restrict the power of the PFC output signal responsive to the second output signal being at and/or going above a predetermined threshold value.

2. The driver arrangement of claim 1, wherein the control circuit is configured to restrict the power of the PFC output signal by either:

restricting the maximum power of the PFC output signal or stopping the PFC converter from outputting the PFC output signal, responsive to the second output signal being at or above the predetermined threshold value.

3. The driver arrangement of claim 1, wherein the predetermined threshold value is a value that is caused by an open fault of a load powered by the load powering signal.

4. The driver arrangement of claim 1, wherein the control circuit is configured to, responsive to the second output signal being below the predetermined threshold voltage, control the PFC converter to operate in the positive feedback loop, in which the PFC converter increases the PFC output signal as the first output signal increases such that the percentage of the PFC output signal in the load powering signal is no less than a predetermined percentage by calculating a percentage of the PFC output signal in the load powering signal;

increasing the PFC output signal if the percentage is less than the predetermined percentage, and decreasing the PFC output signal if the percentage is higher than the predetermined percentage.

5. The driver arrangement of claim 1, wherein the switched-mode power supply comprises a current control loop adapted to sense an electrical current of the load powering signal;

compare the electrical current with the electrical current reference; and control the switched-mode power supply to regulate the offset signal in a way of increasing the offset signal if the electrical current is less than the electrical current reference, and decreasing the offset signal if the electrical current is larger than the electrical current reference, such that the sensed current follows the electrical current reference which is constant.

6. The driver arrangement of claim 1, wherein said control circuit comprises a first voltage sense circuit to sense, as the first output signal, any one of:

a voltage of the load powering signal;

a voltage of the PFC output signal; or a voltage of the offset signal.

7. The driver arrangement of claim 6, wherein said control circuit comprises a second voltage sense circuit to sense, as the second output signal, any one of:

a voltage of the load powering signal;

a voltage of the PFC output signal; or a voltage of the offset signal.

8. The driver arrangement of claim 7, wherein:

the PFC converter comprises a feedback terminal and the PFC converter is configured to modify the PFC output signal responsive to the signal at the feedback terminal; and the control circuit is configured to modify the signal at the feedback terminal, wherein the control circuit comprises
  - a first signal conversion circuit between the first voltage sense circuit and the feedback terminal, adapted to convert, for the feedback terminal, the first output signal with one of a positive gain and an inverted gain; and
  - a second signal conversion circuit between the second voltage sense circuit and the feedback terminal, adapted to convert the second output signal, for the feedback terminal, with the other one of the positive gain and the inverted gain.

9. The driver arrangement of claim 8, wherein the first voltage sense circuit comprises a voltage divider connected across the connection of the first output interface and the second output interface, wherein the voltage divider is configured to sense the voltage of the load powering signal as the first output signal.

10. The driver arrangement of claim 9, wherein the first signal conversion circuit comprises a voltage inverting circuit connected between the voltage divider and the feedback terminal and configured to generate, at the feedback terminal, a voltage that is inversely changed with respect to the voltage of the load powering signal, wherein, the PFC converter is adapted to increase the PFC output signal as the voltage at the feedback terminal decreases and therefore as the first output signal increases.

11. The driver arrangement of claim 8, wherein:

the second signal conversion circuit comprises a trigger circuit coupled to the second output interface and adapted to sense the voltage of the offset signal as the second output signal, and pull the feedback terminal to a high voltage when the second output signal is at or above the predetermined threshold value, and the PFC converter is configured to restrict the PFC output signal when the voltage at the feedback terminal is the high voltage.

12. The driver arrangement of claim 1, wherein the switched-mode power supply is adapted to, responsive to a voltage of the offset signal reaching a predetermined voltage threshold, enter a protection mode and clamp the voltage of the offset signal at the predetermined voltage threshold.

13. An electronic arrangement comprising:

the driver arrangement of claim 1; and a load connected to the first output interface and second output interface and configured to be powered by the load powering signal.

14. The electronic arrangement of claim 13, wherein the load comprises one or more light emitting diodes.

* * * * *